(12) United States Patent
Sakai

(10) Patent No.: US 8,443,266 B2
(45) Date of Patent: May 14, 2013

(54) DATA PROCESSING METHOD AND DATA PROCESSOR

(75) Inventor: Yuki Sakai, Yokohama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 386 days.

(21) Appl. No.: 12/816,631

(22) Filed: Jun. 16, 2010

(65) Prior Publication Data

US 2010/0325501 A1    Dec. 23, 2010

(30) Foreign Application Priority Data

Jun. 18, 2009   (JP) ................................. 2009-144840

(51) Int. Cl.
*H04L 1/0057*    (2006.01)

(52) U.S. Cl.
USPC ......................................................... 714/776

(58) Field of Classification Search ................... 714/776
See application file for complete search history.

(56) References Cited

U.S. PATENT DOCUMENTS

| | | | |
|---|---|---|---|
| 6,125,469 A * | 9/2000 | Zook et al. | 714/769 |
| 6,516,435 B1 * | 2/2003 | Tsunoda | 714/751 |
| 6,594,262 B1 * | 7/2003 | Kwon et al. | 370/395.1 |
| 7,197,687 B2 * | 3/2007 | Imura et al. | 714/776 |
| 7,512,865 B2 * | 3/2009 | Lu | 714/769 |
| 7,844,884 B2 * | 11/2010 | Roh et al. | 714/776 |
| 2001/0055290 A1 | 12/2001 | Seidel et al. | |
| 2005/0166117 A1 * | 7/2005 | Suwa | 714/746 |
| 2007/0189226 A1 | 8/2007 | Roh et al. | |
| 2008/0002659 A1 | 1/2008 | Fontaine et al. | |
| 2009/0041088 A1 * | 2/2009 | Yang et al. | 375/132 |
| 2009/0313529 A1 * | 12/2009 | Goma et al. | 714/777 |

FOREIGN PATENT DOCUMENTS

| | | |
|---|---|---|
| JP | 2001-358699 A | 12/2001 |
| JP | 2007-195185 A | 8/2007 |
| JP | 2008-17467 A | 1/2008 |

* cited by examiner

*Primary Examiner* — James C Kerveros

(74) *Attorney, Agent, or Firm* — Arent Fox LLP

(57) ABSTRACT

A data processing method includes checking an error on a first header, and determining whether or not to correct the error on the first header based on an error correction count for an first error correction processing block including the first header.

14 Claims, 8 Drawing Sheets

FIG.3

| Modulation | Cording Rate | BER | | |
|---|---|---|---|---|
| | | 1.00 − E02 | 1.00 − E03 | 1.00 − E04 |
| QPSK | 1/2 | 1.20 − E01 | 1.00 − E01 | 9.00 − E02 |
| QPSK | 3/4 | 5.00 − E02 | 4.00 − E02 | 3.00 − E01 |
| 16QAM | 1/2 | 1.30 − E01 | 1.10 − E01 | 1.00 − E01 |
| 16QAM | 3/4 | 6.00 − E02 | 4.00 − E02 | 3.00 − E01 |
| 64QAM | 1/2 | 1.27 − E01 | 1.20 − E01 | 1.10 − E01 |
| 64QAM | 2/3 | 7.00 − E02 | 6.00 − E02 | 4070 − E01 |
| 64QAM | 3/4 | 5.80 − E02 | 4.00 − E02 | 3.40 − E02 |
| 64QAM | 5/6 | 3.20 − E02 | 2.30 − E02 | 1.50 − E02 |

REFERENCE VALUE OF ERROR CORRECTION RATE

DATA PROCESSING METHOD AND DATA PROCESSOR

CROSS-REFERENCE TO RELATED APPLICATION

This application is based upon and claims the benefit of priority of Japanese Patent Application No. 2009-144840, filed on Jun. 18, 2009, the entire contents of which are incorporated herein by reference.

FIELD

The application discussed herein relates to a data processing method and a data processor.

BACKGROUND

In radio communication systems, for example, in a WiMAX (Worldwide Interoperability for Microwave Access) system, a MAC (medium access control) layer protocol is a protocol that is common to physical layers. When data is exchanged between a base station and a mobile station, association (e.g., mapping) between MAC layers in the base station and the mobile station is performed to establish a connection.

Data is exchanged using a plurality of packets, which have the format of protocol data units defined by a MAC protocol (the protocol data units may be hereinafter referred to as "MAC-PDUs" or simply "PDUs"). The MAC-PDU has a MAC header field and a payload field. The MAC header field includes information, such as a PDU configuration system, a PDU length, and a connection ID (CID). The payload field includes data. The payload field, however, is optional. As the MAC header, a generic MAC header (GMAC) and a MAC control header are available.

A burst is a group of one or more PDUs and a frame is a group of one or more bursts. A reception device distinguishes a burst field from a frame, checks the connection IDs in the MAC headers of the PDUs in the burst to select PDUs addressed to the reception device, and processes the selected PDUs.

In radio communication, for example, error occurs in reception data, depending on the state of a communication medium between a transmitting end and a receiving end. Thus, in the radio communication, the MAC header field and the payload field have error correction code bits, such as cyclic redundancy check (CRC) bits, in order to allow the receiving end to detect errors. A CRC in the MAC header field is called a header check sequence (HCS) and a CRC for detecting errors in the payload field and the entire PDU is called a frame check sequence (FCS).

A reception processing device in the reception device sequentially performs error checking and data processing on the PDUs in the burst. For example, in a case in which error checking using an HCS bit in the MAC header of the PDU indicates OK, e.g., when the connection ID in the MAC header is addressed to the reception device, the reception processing device performs data processing on the PDU. When the connection ID is not addressed to the reception device, the reception processing device discards the PDU and performs error checking and data processing on a next PDU. The MAC header includes a length field having information indicating the data length of the PDU. The reception processing device extracts a next PDU based on the data length in the length field.

When error checking based on the HCS bit indicates NG (No Good), the data of the PDU is not reliable and thus the front end of a next PDU may not be identified. Thus, processing for discarding the unreliable PDU and all of the subsequent PDU(s) in the burst is performed. With this method, however, all the remaining PDU(s) in the burst are discarded, resulting in a sharp decrease in the throughput.

It has been proposed that, when the error checking based on the HCS bit is NG, the next MAC header is scanned to predict the front end of a next PDU. According to the proposed technology, error checking based on the HCS bit in the MAC header is performed each time the scan is performed through 1-byte shifting, and when the result of the checking is OK, the predicted PDU is determined to be corrected and is thus recovered through data processing. One example is disclosed in Japanese Laid-open Patent Publication No. 2007-195185.

Processing PDUs in a communication system is also proposed in, for example, Japanese Laid-open Patent Publication Nos. 2008-17467 and 2001-358699.

When error checking based on the HCS bit indicates NG, discarding all of the subsequent PDUs in the burst being processed is not preferable since the throughput decreases sharply.

According to the PDU recovery method disclosed in Japanese Laid-open Patent Publication No. 2007-195185, under a communication environment where the amount of noise is large, even when error checking based on the HCS bit in the MAC header indicates OK, it is highly likely that the result of error checking based on a CRC bit in the PDU becomes NG. Thus, even when the PDU recovery processing is performed, the result of error checking based on the CRC bit in the PDU becomes NG and the PDU is eventually discarded. This results in a decline in the performance of the data reception processing.

SUMMARY

According to an aspect, a data processing method includes checking an error on a first header, and determining whether or not to correct the error on the first header based on an error correction count for a first error correction processing block including the first header.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3 illustrates relationships between a bit error rate (BER) and error correction rates, the relationships being empirically determined by using a reception device;

DESCRIPTION OF THE EMBODIMENTS

Figure 1:
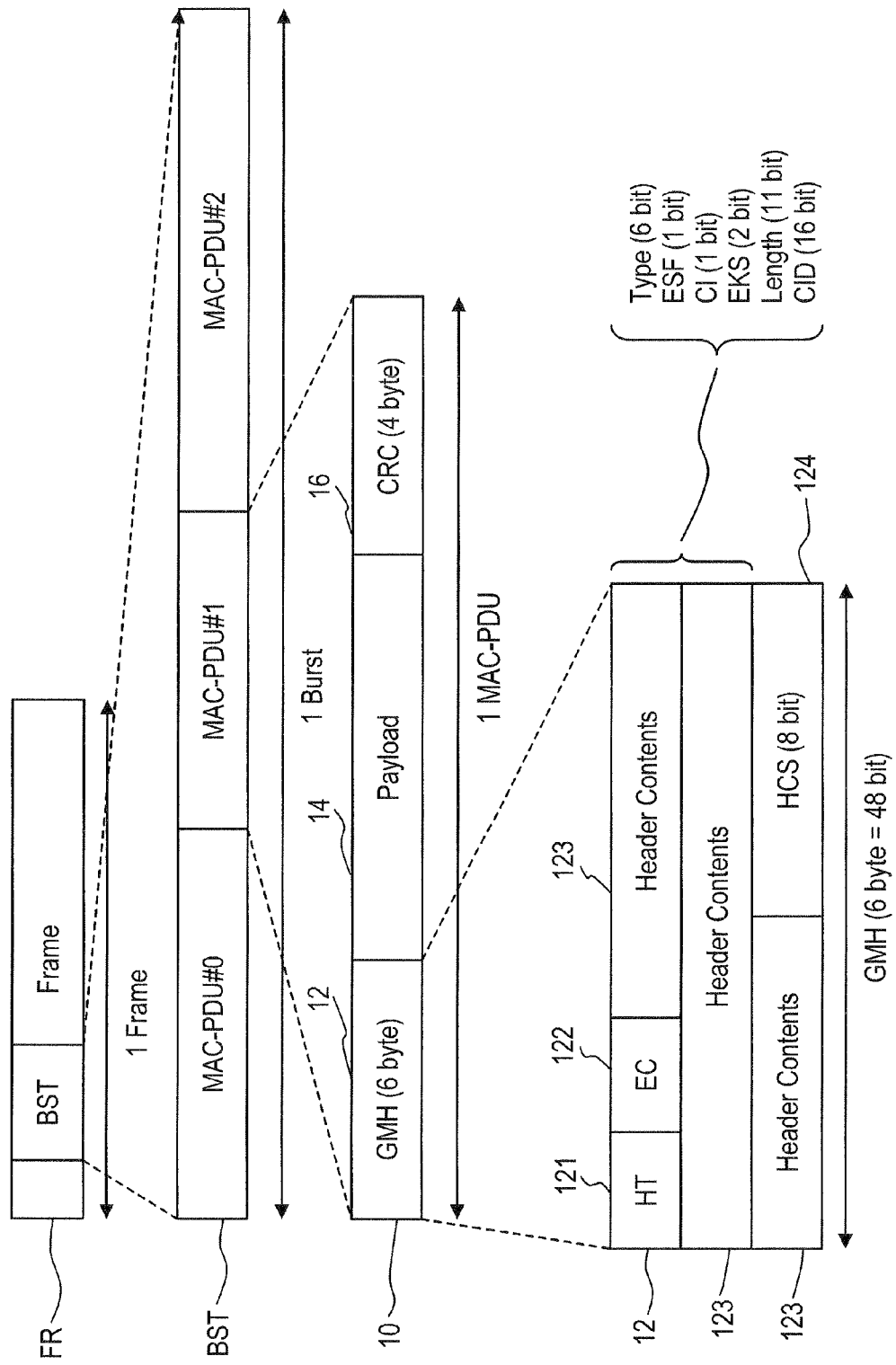
FIG. 1 illustrates the structure of data units in mobile WiMAX.

FIG. 1 illustrates the structure of data units in mobile WiMAX. A frame FR includes one or more bursts BST and each burst BST includes one or more data units 10. In the mobile WiMAX, the data unit 10 is a MAC-PDU (protocol data unit). In the example of FIG. 1, each burst BST has three data units, i.e., MAC-PDUs #0, #1, and #2.

As illustrated at the data unit 10, each MAC-PDU includes a GMH (generic MAC header) 12, a variable-length payload 14, and a 4-byte (32-bit) CRC (cyclic redundancy check) bit 16 serving as an error correction code for the MAC-PDU. The GMH 12 is included and the payload 14 and the CRC bit 16 are optional.

The GMH 12 has a 6-byte (48-bit) fixed length and includes a header type (HT) 121 indicating a header type (generic MAC header or MAC control header), an encryption control 122 (EC) indicating whether or not the payload is encrypted, header contents 123 in which various types of information are stored, and an 8-bit fixed-length header check sequence (HCS) 124 for checking an error in the header. As illustrated in FIG. 1, the header contents 123 include a type, an extended subheader field (ESF), a CRC indicator (CI), an encryption key sequence (EKS), a length indicating the length of the MAC-PDU, a connection ID (CID), among others.

A data reception processing device in a reception device determines whether or not a MAC-PDU is addressed thereto based on the connection ID in the header. The data reception processing device may also detect a front-end position of a next MAC-PDU based on length information in the header.

The MAC-PDUs in the burst BST may have data lengths that are different from each other. A transmission device divides the burst BST into a plurality of fixed-length error correction processing blocks based on a certain rule and performs forward error correction coding, such as convolution coding, on each error correction processing block. In turn, in the reception device, reception processing is performed on a radio signal, error correction processing is performed on error bits to a possible extent through forward error correction on baseband reception data, and the error-corrected reception data is supplied to the data reception processing device.

The error correction processing block to be subjected to the forward error correction coding is referred to as a "forward error correction (FEC) block". In the reception device, the forward error correction is performed immediately after a high-frequency reception circuit.

The data reception processing device at a subsequent stage temporarily stores the error-corrected reception data in a reception buffer, analyzes the header of each MAC-PDU in the burst BST, detects the MAC-PDU addressed to the reception device based on the connection ID (CID), and performs appropriate data processing on the detected MAC-PDU. The data reception processing device reads a next MAC-PDU from the reception buffer based on the length information in the header and sequentially performs processing for checking whether the MAC-PDU has an error and whether or not the MAC-PDU is addressed to the reception device.

The data reception processing device also checks whether or not an error exists in the GMH based on the 8-bit fixed-length HCS bit 124 in the GMH 12. The HCS bit 124 is, for example, a CRC code. Performing computation on the HCS bit 124 and other data in the GMH makes it possible to determine whether or not an error exists in the GMH. In addition, when the error bit is 1 bit, the position of the error bit may be located and error correction may be performed through inversion of the 1-bit error bit. For the HCS bit, however, the number of error bits may not generally be identified.

In addition, when the payload 14 is present, the MAC-PDU 10 also has a 4-byte fixed-length CRC bit 16. Thus, the data reception processing device checks whether or not an error exists in the MAC-PDU based on the CRC bit 16.

Figure 2:
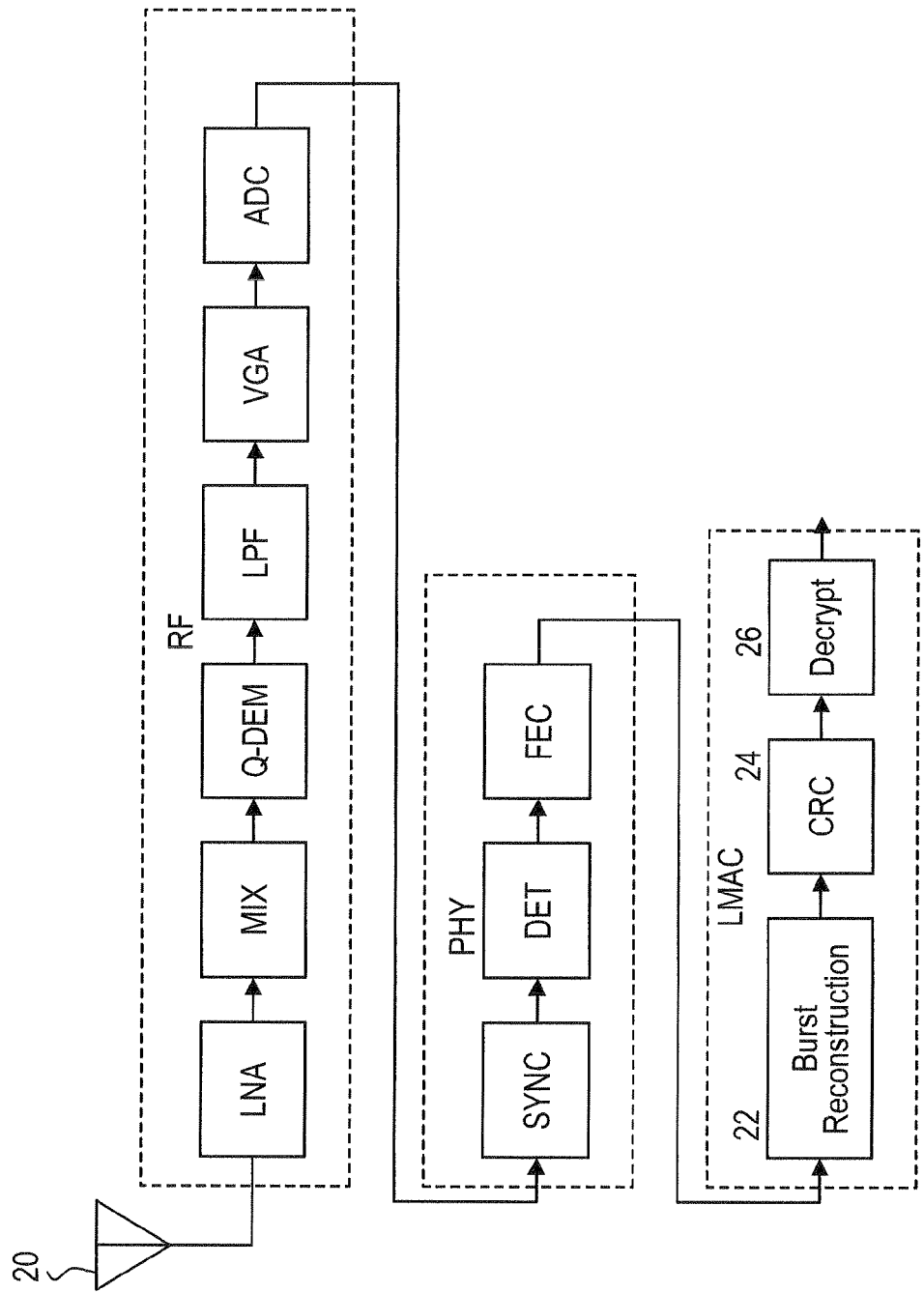
FIG. 2 illustrates a reception device according to an embodiment.

FIG. 2 is a block diagram of a reception device according to an embodiment. The reception device has a high-frequency analog circuit RF for processing a high-frequency signal received by an antenna 20, a physical-layer circuit PHY for performing frequency synchronization control SYNC and phase synchronization control DET on a reception digital signal and performing forward error correction for each FEC block, and a low-level MAC layer circuit LMAC.

The high-frequency analog circuit RF includes a low-noise amplifier LNA, a mixer MIX, a quadrature demodulator Q-DEM, a low-pass filter LPF, a variable gain amplifier VGA, an analog-to-digital converter ADC, for example. The high-frequency analog circuit RF processes a received high-frequency signal to generate baseband reception data and supplies the baseband reception data to the physical-layer circuit PHY. The physical-layer circuit PHY includes a frequency synchronization controller SYNC, a phase synchronization controller DET, and a forward error corrector FEC. The forward error corrector FEC performs forward error correction for each FEC block. Through the processing, it is possible to obtain an error correction count for an FEC block or an error correction rate (a rate obtained by dividing the error correction count by the number of bits in the FEC block).

The low-level MAC layer circuit LMAC includes a burst reconstruction circuit 22, a CRC circuit 24, and a decryption circuit 26. While reconstructing a plurality of bursts mixed in the reception data, the burst reconstruction circuit 22 temporarily stores the bursts in the reception data, and detects, from the reception buffer, a MAC-PDU addressed to the reception device. The CRC circuit 24 performs error checking based on the CRC bit in the detected MAC-PDU addressed to the reception device. When no error is detected by the CRC checking, the decryption circuit 26 decrypts the encrypted MAC-PDU. The deciphered MAC-PDU is subjected to data processing by a processing circuit at a subsequent stage (not illustrated).

In the present embodiment, the above-described burst reconstruction circuit 22 corresponds to the data reception processing device. In the present embodiment, when the result of the error checking based on the HCS bit in the MAC-PDU in the burst BST is NG (No Good), the burst reconstruction circuit 22 recovers the MAC-PDU from which the error is detected and the subsequent MAC-PDUs without a considerable reduction in the performance of the reception processing.

For example, in the burst BST having three MAC-PDUs #0 to #2 illustrated in FIG. 1, when the result of error checking based on the HCS bit 124 in the GMH 12 of the second MAC-PDU #1 is NG (i.e., when an error is detected), the information in the header, particularly, the length information needed to locate the position of the header of the next MAC-PDU #2 is highly likely to include an error bit and is thus uncertain. Thus, the front-end position of the next MAC-PDU #2 may not be located. Accordingly, in typical data reception processing, the MAC-PDU #1 from which the error in the burst BST is detected and all subsequent MAC-PDU(s) #2 in the burst BST are discarded and similar data processing is performed on a next burst BST.

However, since all the remaining MAC-PDUs in the burst BST are discarded in the above-described processing, there is a possibility that a MAC-PDU that is addressed to the reception device and that may be included in the MAC-PDUs discarded may not be received. This results in a significant reduction in the throughput.

According to Japanese Laid-open Patent Publication No. 2007-195185, when the result of HCS checking on a GMH of the nth MAC-PDU is NG, the length information in the GMH is assumed to include no error and, based on the length information, the processing jumps to the front end of a next MAC-PDU, i.e., the (n+1)th MAC-PDU, in a reception buffer, and 6-byte data corresponding to the GMH of the (n+1)th MAC-PDU is read for HCS checking of the GMH. When the result of the HCS checking is OK, it may be regarded that the length information is correct and thus normal processing is resumed from the (n+1)th MAC-PDU. When the result of the HCS checking is NG, it may be regarded that the length information is not correct. Thus, 6-byte data is read while scanning the reception buffer from the front end of the nth MAC-PDU through byte-by-byte shifting. Further, HCS checking is performed assuming that the read 6-byte data is a GMH, and the scan-and-search is performed until the result of the HCS checking becomes OK.

In the above-described method, even when the result of the HCS checking on the GMH of the nth MAC-PDU is NG, there is a possibility that at least the (n+1)th MAC-PDU may be recovered and thus a significant decrease in the throughput may be reduced if not prevented.

However, under a communication environment where the amount of noise is large, even if the (n+1)th MAC-PDU is recovered, the possibility that the CRC circuit 24 detects an error in the error checking of the entire MAC-PDUs by using the CRC bits 16 is high and, consequently, the possibility that the recovered (n+1)th MAC-PDU is discarded is also high. In such a case, the recovery processing ends in vain, thus leading to a decline in the overall performance.

In addition, in the scan-and-search of the (n+1) the MAC-PDU, the likelihood that no error is detected in the error checking based on the HCS bit in the GMH is 1/256 (0.39%), and thus there is a possibility that a portion that is not a GMH is falsely recognized as a GHM. Therefore, determining that a GMH is correct based on the HCS bit therein may incur false recognition, thus leading to a decline in the performance.

In addition, since the nth MAC-PDU for which the HCS error checking indicates NG is not recovered, the throughput decreases when it is a MAC-PDU addressed to the reception device.

In contrast, the data reception processing device according to the present embodiment performs high-accuracy recovery processing including the nth MAC-PDU for which the error checking based on the HCS bit indicates NG. Thus, when the error correction count resulting from the forward error correction on the FEC block is smaller than or equal to a reference value, recovery processing including the nth MAC-PDU is performed, and when the error correction count is equal to or greater than the reference value, a MAC-PDU in a next FEC block is detected without recovery processing and reception processing is performed. Since the forward error correction is performed by the physical-layer circuit PHY, as described above with reference to FIG. 2, the burst reconstruction circuit 22 may pre-obtain the error correction count for the FEC block including the MAC-PDU being processed.

The reception device may not obtain transmission data transmitted by the transmission device. Thus, the reception device may not know a bit error rate indicating the transmission quality of a signal on a communication medium between the transmitting end and the receiving end, based on a reception signal. The reception device, however, may know the number of bits corrected by performing forward error correction, immediately after the high-frequency analog circuit RF. That is, the reception device may know the error correction count or the error correction rate (e.g., a value obtained by dividing the error correction count by the number of bits in the FEC block).

It is known that the bit error rate and the error correction count have a certain correlation. For example, when the bit error rate is K bits for one FEC block, a bit error rate of L bits that is smaller than K bits (i.e., $L \leq K$) may be corrected in the forward error correction for the FEC block. As the bit error rate increases, the number of error bits in the reception data increases and the error correction count also increases. Conversely, as the bit error rate decreases, the number of error bits in the reception data decreases and the error correction count also decreases. Accordingly, the bit error rate of the reception data may be estimated based on the error correction count or the error correction rate.

The error correction capability for error correction codes, such as CC (convolutional code) and CTC (convolutional turbo code), used in forward error correction varies depending on a difference in the modulation scheme such as DSK (Double Phase-shift Keying), QPSK (Quadrature Phase-Shift Keying), 16-QAM (Quadrature Amplification Modulation), and 64-QAM or depending on a convolutional-code coding rate (i.e., a coding rate "m/n" obtained when an m-bit information symbol is transformed into an n-bit symbol by encoding ($n \geq m$)). The error correction capability for the error correction codes also varies depending on the capability of the reception device.

Accordingly, for each reception device, the relationship between the bit error rate and the error correction count or the error correction rate resulting from the forward error correction is empirically certain according to a varied modulation scheme and a coding rate. Additionally, a reference value for determining whether or not the recovery processing including the nth MAC-PDU is to be performed when the error checking based on the HCS bit in the nth MAC-PDU indicates NG is preset with respect to the error correction count or the error correction rate. When the error correction count or the error correction rate resulting from the forward error correction on the FEC block is smaller than or equal to the reference value, the data reception processing device performs recovery processing on the MAC-PDU in question, and when the error correction count or the error correction rate is equal to or greater than the reference value, the data reception processing device discards the MAC-PDU in question and the subsequent MAC-PDU(s) in the FEC block and performs processing on a next FEC block. In addition, since the reception device may not know the bit error rate in the communication medium, it may estimate the bit error rate in the communication medium based on the error correction count or the error correction rate, for example. When the estimated bit error rate is smaller than or equal to the reference value, the reception device performs the recovery processing. The arrangement may suppress execution of unnecessary recovery processing and may improve the throughput.

In the mobile WiMAX, the HCS bit in the 6-byte (48-bit) GMH is 1 byte (8 bits) and is generated by computation of the remaining 5-byte GMH. The data reception processing device may detect whether or not an error exists by performing computation based on the HCS bit in the reception data and the remaining 5-byte data. In addition, when an error bit in the GMH is 1 bit, the data reception processing device may identify an erroneous bit based on the result of the computation through the HCS checking. However, the data reception processing device may not know whether or not an erroneous bit is a 1-bit error.

It is now assumed that, when an HCS generator polynomial is $X^8+X^2+X^1+1$, an MSB (most significant bit, the 47th bit) is inverse as in the case of a GMH 1 and GMH 0 given below:

| <LSB (Least significant bit) = 5> | |
|---|---|
| GMH 1 = 0x80AA AA0F 0FD5 | HCS Checking = 0x00 (OK) |
| GMH 0 = 0x00AA AA0F 0FD5 | HCS Checking = 0xE0 (NG) |
| <LSB = 3> | |
| GMH 1 = 0x80AA AA0F 0FD3 | HCS Checking = 0x00 (OK) |
| GMH 0 = 0x00AA AA0F 0FD3 | HCS Checking = 0xE0 (NG) |

In the case, even with the difference between "5" and "3" of the LSB, the result of the HCS check computations become the substantially same.

That is, when the result of the HCS checking is 0xE0, it may be uniquely identified that the position of a 1-bit error is the MSB (the 47th bit). However, the scheme is based on the premise that the occurring error is one bit.

Accordingly, it is necessary to know that one bit in the GMH is erroneous (i.e., is inverse). In the present embodiment, since the GMH has a 6-byte (48-bit) bit string, the possibility that an error in the GMH is 1 bit or less is high when the bit error rate is 1/48 or less. Needless to say, although there is no guarantee that an error in the GMH is 1 bit or less since bit errors may occur intensively at one portion, it may be said, at least, that the possibility of the error rate being 1 bit or less is high when the bit error rate is 1/48 or less.

Accordingly, in the present embodiment, an error correction count or an error correction rate for a bit error rate of $1/10^{-3}$ is empirically certain assuming that the possibility that an error in the GMH is 1 bit or less is significantly high when the bit error rate is $1/10^{-3}$ or less which is one digit smaller than the bit error rate of 1/48. The determined error correction count or error correction rate is used as the reference value for determining whether or not a MAC-PDU from which an HCS error is detected is to be recovered.

FIG. 3 is a table illustrating relationships between the bit error rate (BER) and error correction rates, the relationships being empirically determined by using the reception device of an aspect. In the table, for each of three types of bit error rate, error correction rates resulting from the forward error correction on an FEC block (60 bytes) are illustrated in association with a modulation scheme (Modulation) and a coding rate. For the three types of bit error rate which represent communication environments, error correction rates were determined, respectively, through changes of the modulation scheme and the coding rate. In the empirical example, the FFT (Fast Fourier Transform) size is 1024.

Since the error correction rate is obtained by dividing the error correction count for the FEC block by the number of bits in the FEC block, the error correction rate and the error correction count correspond to each other on a one-to-one basis when the number of bits in the FEC is fixed. Thus, in FIG. 3, error correction counts for two types of bit error rates (BER) may be certain. In FIG. 3, the error correction rate for the BER=1.00–E03 (1/1000) is used as the reference value.

Figure 4:
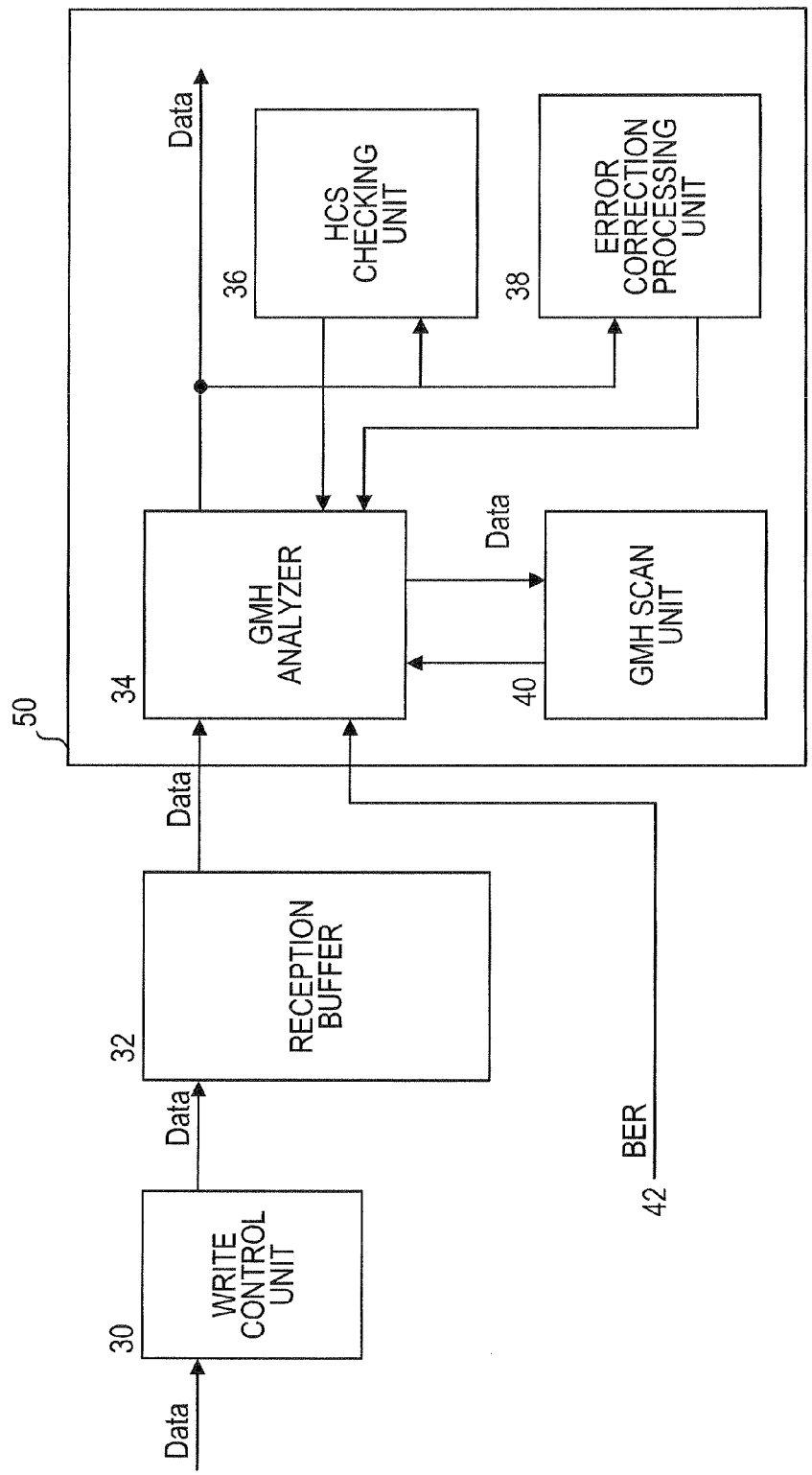
FIG. 4 illustrates a data reception processing device in the reception device in FIG. 2.

FIG. 4 is a block diagram of the data reception processing device according to an aspect. As described above, the data reception processing device corresponds to the burst reconstruction circuit 22 illustrated in FIG. 2. The burst reconstruction circuit 22 has a reception buffer 32 and a reception processing unit 50. The reception buffer 32 temporarily stores received MAC-PDUs. The reception processing unit 50 performs error checking on the GMHs in the reception buffer 32. Upon detecting an error in the error checking, the reception processing unit 50 may determine whether or not to perform error correction processing on the GMH from which the error is detected, based on the error correction count 42 for the error correction processing block including the GMH in question.

Alternatively, upon detecting an error in the error checking, the reception processing unit 50 may perform recovery processing on the MAC-PDU including the GMH from which the error is detected and the subsequent MAC-PDUs, when the error current count or the error correction rate 42 for the error correction processing block including the header from which the error is detected is smaller than or equal to the reference value, and may discard the MAC-PDU including the header from which the error is detected and the subsequent MAC-PDU(s) in the error correction processing block.

In FIG. 4, reception data supplied from the physical-layer circuit PHY at the previous stage is temporarily stored in the reception buffer 32 by a write control unit 30. Since a plurality of bursts are mixed in the reception data, the write control unit 30 distinguishes the reception data for each burst and writes the reception data to corresponding areas in the reception buffer 32 to thereby reconstruct the a plurality of bursts.

The reception processing unit 50 includes a GMH analyzer 34, an HCS checking unit 36, an error correction processing unit 38 that performs error correction processing based on the HCS bit, and a GMH scan unit 40. An error correction count 42 detected by the forward error corrector (FEC) in the physical-layer circuit PHY is supplied to the GMH analyzer 34. The GMH analyzer 34 has therein a reference-value association table illustrated in FIG. 3, and determines whether or not to recover the MAC-PDU from which an error is detected, based on whether or not the error correction count 42 for the current FEC block is smaller than or equal to the reference value.

Figure 5:
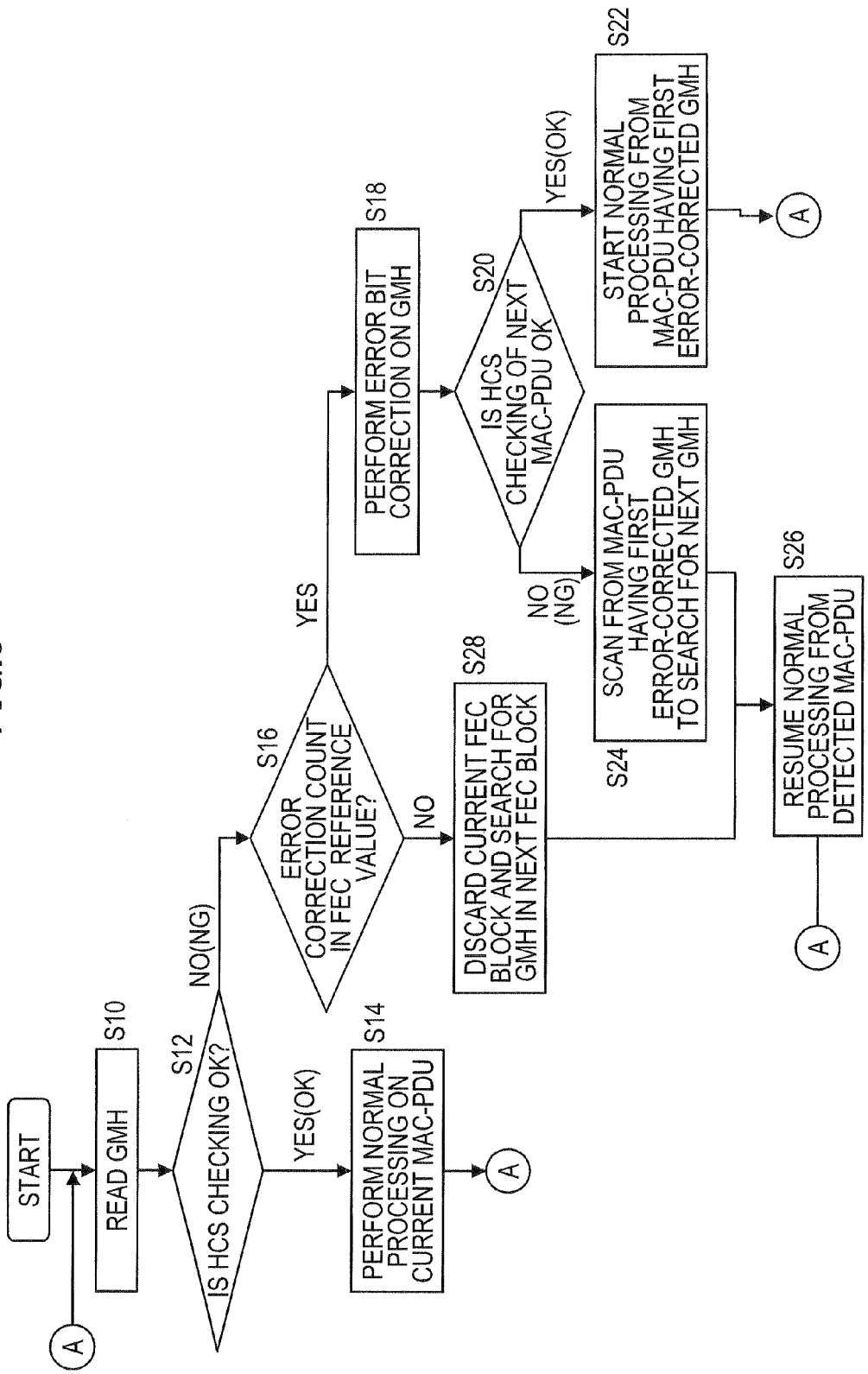
FIG. 5 is a flowchart of a processing procedure for the reception processing unit illustrated in FIG. 4.

FIG. 5 is a flowchart illustrating a processing procedure for the reception processing unit 50 in the present embodiment. Reception data processing in the present embodiment will now be described with reference to the flowchart.

First, the GMH analyzer 34 reads a GMH in a burst temporarily stored in the reception buffer 32 (in S10). For example, the address of the first GMH in the burst is substantially the same as the front-end address in the burst, and the address of a next GMH is an address shifted from the address of the first GMH by an amount corresponding to the length information of the MAC-PDU.

The GMH analyzer 34 reads, from the reception buffer 32, a GMH in an FEC block (in S10). The GMH analyzer 34 then performs HCS error checking on the read GMH (in S12). The HCS error checking is performed by the HCS checking unit 36. When the result of the error checking is OK, normal processing is performed on the MAC-PDU having the GMH (in S14). In the normal processing, when error checking on CRC in the MAC-PDU indicates OK, whether or not the MAC-PDU is addressed to the reception device is determined based on the connection ID. When the MAC-PDU is addressed to the reception device, the data of the payload is supplied to the subsequent circuit. The GMH analyzer 34 then jumps the processing to the address of a next GMH based on the length information in the GMH to read the next GMH from the reception buffer 32 (i.e., the process returns to A in FIG. 5).

When the result of the HCS-error-checking process in S12 is NG, the GMH analyzer 34 determines whether or not the error correction count 42 in the forward error correction on the FEC block including the GMH is smaller than or equal to the certain reference value (in S16). When the error correction count 42 is smaller than or equal to the reference value (YES in S16), the header analyzer 34 performs MAC-PDU recovery processing (S18 to S24) described below.

On the other hand, when the error correction count 42 exceeds the reference value (NO in S16), the MAC-PDU having the GMH for which the HCS error checking for the current FEC block is NG and the subsequent MAC-PDU(s) in the current FEC block are discarded and a GMH in a next FEC block is searched for (in S28). Searching for a GMH in a next FEC block is described below.

When the error correction count 42 is smaller than or equal to the reference value (YES in S16), the GMH analyzer 34 performs correction (S18) on the GMH for which the result of the HCS error checking was NG by inverting an error bit identified by error correction computation. The error correction processing is performed by the error correction processing unit 38. The GMH analyzer 34 may not check whether or not an error bit is 1 bit or less. However, when the error correction count in the forward error correction is less than or equal to the reference value, the possibility that the number of error bits in the 48-bit GMH is at most one is presumed to be high since the bit error rate in the communication environment is 1/1000. Thus, in the error bit correction in S18, even when the HCS error checking indicates NG, it is possible to correct the error in the GMH with a high possibility. With the arrangement, correct length information in the GMH may be obtained with a high possibility.

The GMH analyzer 34 then jumps the processing to the address of a next candidate GMH in the reception buffer 32 based on the length information in the error-corrected GMH to read data of the candidate GMH (in S20). The GMH analyzer 34 further causes the HCS checking unit 36 to perform HCS checking on the read candidate GMH data (in S20). When the result of the HCS checking is OK (YES in S20), this means that the length information in the first error-corrected GMH is correct and thus normal processing is started from the MAC-PDU having the first error-corrected GMH (in S22). The normal processing is analogous to the processing in process S14. With this arrangement, the first error-corrected MAC-PDU may be recovered and, when the MAC-PDU is addressed to the reception device, the throughput may be significantly improved.

On the other hand, when the result of the HCS checking is NG (NO in S20), there is a possibility that the length information in the first error-corrected GMH includes an error and thus the GMH analyzer 34 searches for the GMH of a MAC-PDU next to the MAC-PDU including the first error-corrected GMH (in S24).

Figure 6:
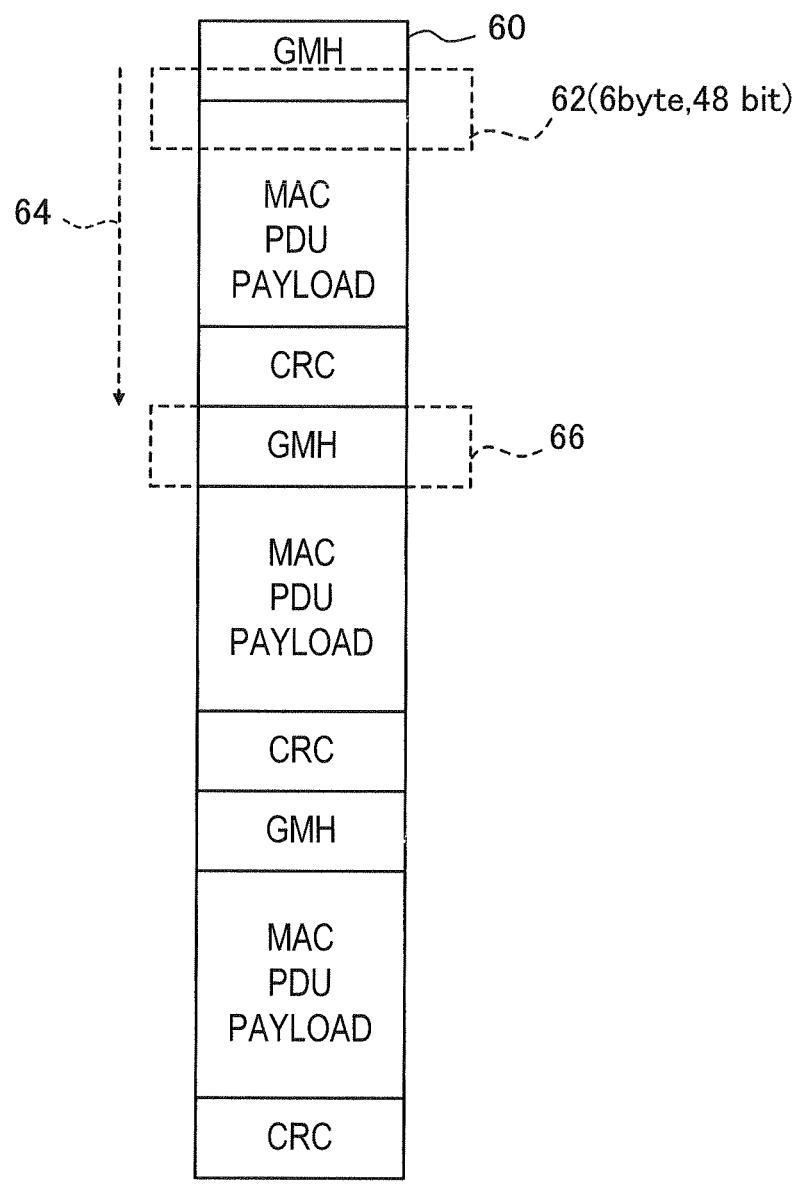
FIG. 6 illustrates a method, related to FIG. 5, for searching for a next GMH.

FIG. 6 illustrates a scan-and-search of a next GMH. The GMH analyzer 34 uses the GMH scan unit 40 to read 6-byte (48-bit) data 62, from the reception buffer 32, from the address of a first error-bit-corrected GMH 60 while incrementing the address, as indicated by 64 in FIG. 6. The GMH analyzer 34 then uses the HCS checking unit 36 to perform HCS error checking, assuming that the last 8 bits of the read 6-byte (48-bit) data 62 is an HCS bit string. When the result of the HCS error checking is NG, the GMH analyzer 34 assumes that the read 6-byte data 62 is not a GMH and the GMH scan unit 40 reads 6-byte data 62 at a next address from the reception buffer 32. The HCS checking unit 36 then performs HCS checking that is similar to that described above. Repeating the above-described operations makes it possible to extract a next GMH 66 illustrated in FIG. 6. That is, when the result of the HCS checking on the 6-byte data 62 is OK, it may be assumed that the 6-byte data 62 is a correct GMH.

After the processing in S24, the GMH analyzer 34 resumes normal processing from the MAC-PDU detected by the search (S26). The normal processing is also analogous to the processing in process S14.

As described above, the MAC-PDU having the GMH for which the HCS error checking indicates NG and the subsequent MAC-PDU(s) in the current FEC block are discarded and a GMH in a next FEC block is searched for (in S28). The search method will be described below.

Figure 7:
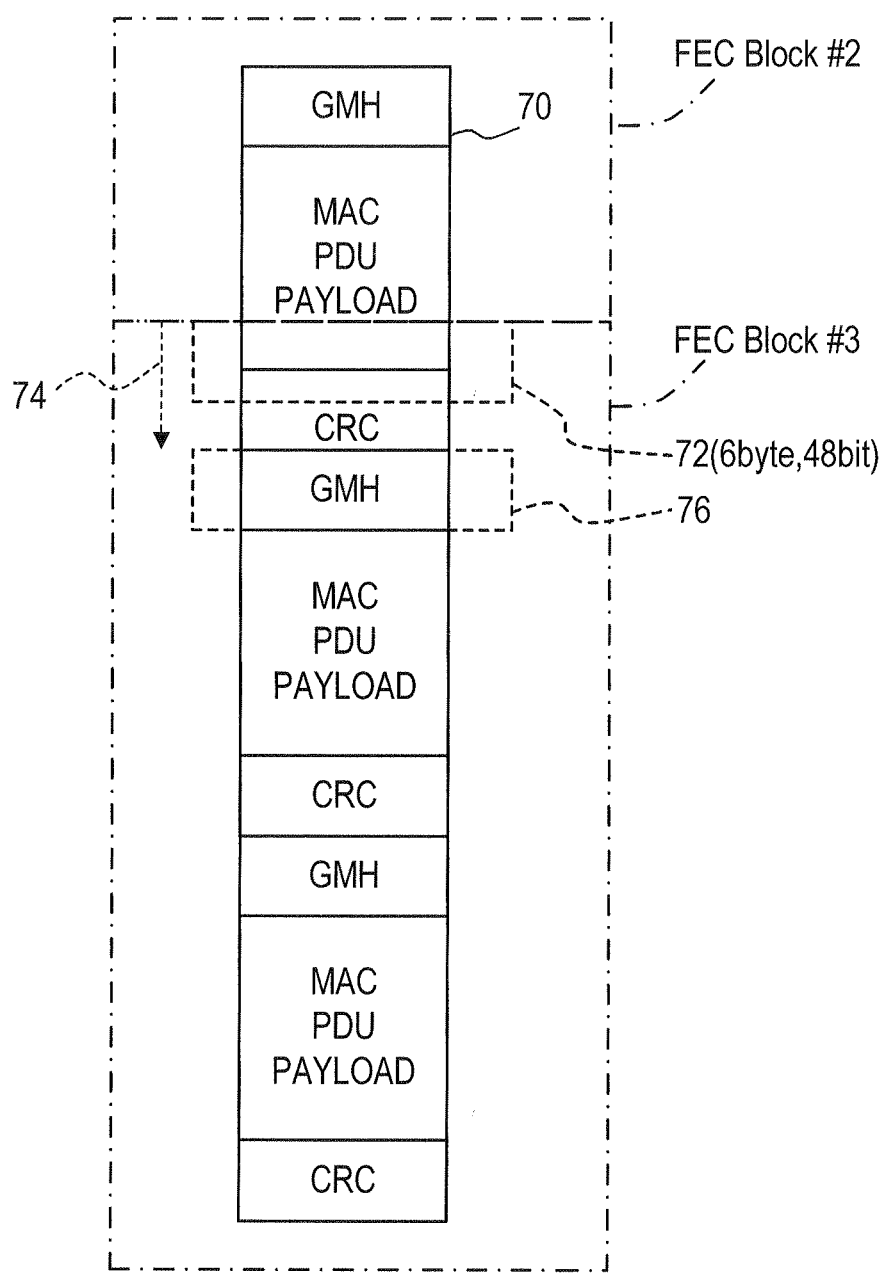
FIG. 7 illustrates a method, related to FIG. 6, for searching for a GMH in an FEC block.

FIG. 7 illustrates a method for searching for a GMH in an FEC block. In FIG. 7, when the data of an FEC block #2 is discarded, 6-byte (48-bit) data 72 is read from the front-end address in a next FEC block #3 from the reception buffer 32. The reading is performed by the GMH scan unit 40. The GMH analyzer 34 then uses the HCS checking unit 36 to perform HCS error checking, assuming that the last 8 bits of the read 6-byte data 72 is an HCS bit string, in the substantially same manner described above. When the result of the error checking is NG, the GMH analyzer 34 assumes that the read 6-byte data 72 is not a GMH and the GMH scan unit 40 reads 6-byte data 72 at a next address from the reception buffer 32. The HCS checking unit 36 then performs HCS checking that is similar to that described above. Repeating the above-described operations, as indicated by 74 in FIG. 7, makes it possible to extract a first GMH 76 in the FEC block #3 in FIG. 7.

After the processing in S28, normal processing is resumed from the MAC-PDU having the GMH detected in process S28 (in S26).

Figure 8:
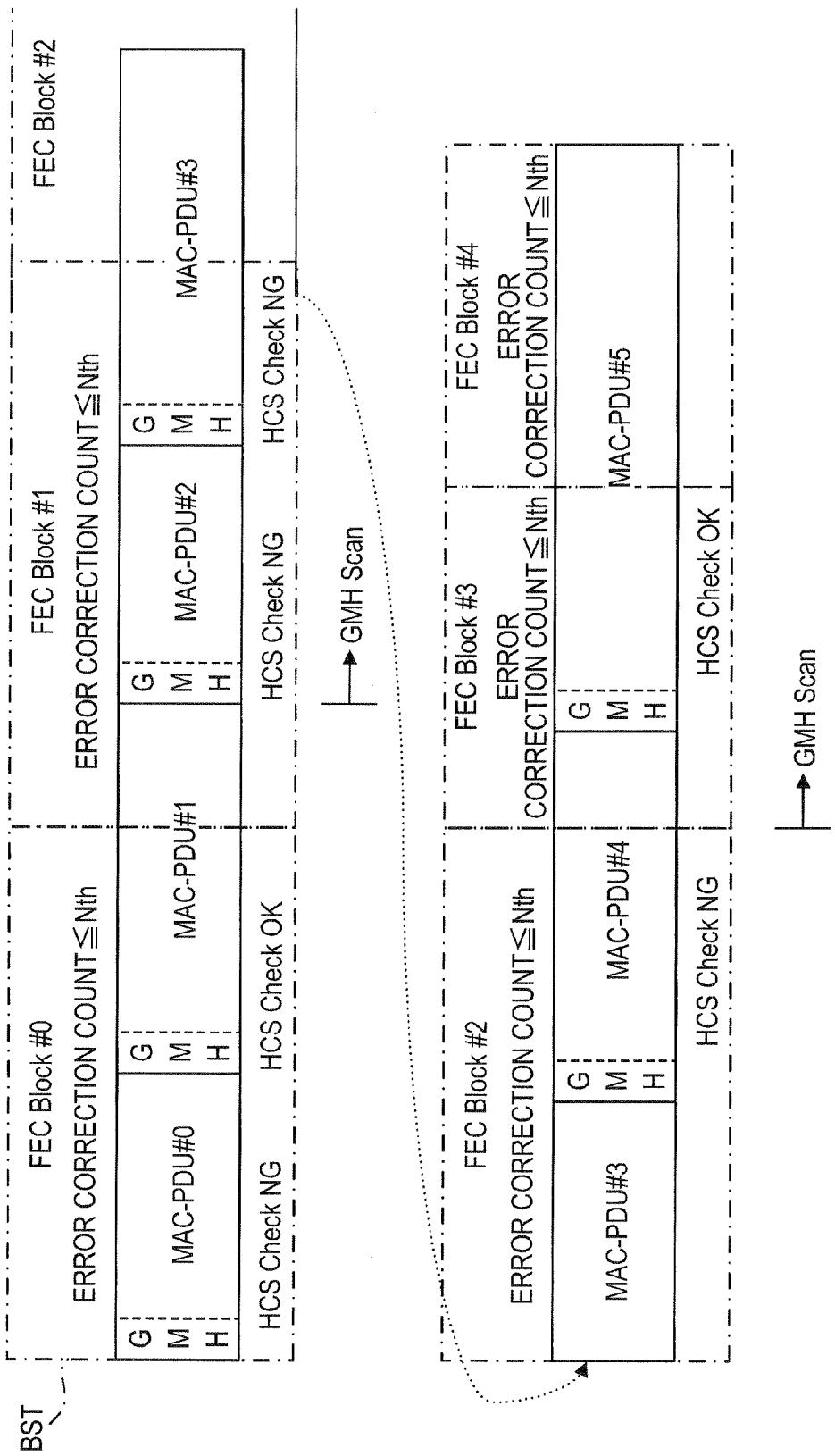
FIG. 8 illustrates an example of a burst to describe a data unit recovery method according to an aspect.

FIG. 8 illustrates an example of a burst BST to describe a data-unit recovery processing in the present embodiment. In addition, FIG. 8 illustrates six MAC-PDUs #0 to #5 included in one burst BST and five FEC blocks #0 to #4. The three FEC blocks #0 to #2 have bit lengths (60 bytes) that are equal to each other, and the two FEC blocks #3 and #4 have bit lengths that are equal to each other but are shorter than the bit lengths of the FEC blocks #0 to #2. FIG. 8 further illustrates a relationship between the error correction count in the forward error correction on each FEC block and the reverence value Nth. Moreover, FIG. 8 also illustrates an HCS-checking result OK or NG for the GMH in each MAC-PDU. The data-unit recovery processing (illustrated in FIG. 5) for the data reception processing device will now be described in conjunction with the example in FIG. 8.

The GMH of the first MAC-PDU #0 in the burst BST is read from the reception buffer 32 (in S10) and the result of the HCS checking is NG (i.e., NO in S12). Since the error correction count for the FEC block #0 is smaller than or equal to the reference value Nth (i.e., YES in S16), the data reception processing device performs GMH error-bit correction based on the HCS bit of the MAC-PDU #0 (in S18). Thereafter, the result of the HCS error checking on the GMH of the next MAC-PDU #1 is OK (i.e., YES in S20), and normal processing is started from the MAC-PDU #0 (in S22).

Next, the GMH of the MAC-PDU #2 is read from the reception buffer 32 (in S10) and the result of the HCS checking is NG (i.e., NO in S12). However, since the error correction count for the FEC block #1 is less than or equal to the reference value Nth (i.e., YES in S16), the data reception processing device performs GMH error-bit correction based on the HCS bit of the MAC-PDU #2 (in S18). Subsequently, the result of HCS error checking on a candidate GMH of the next MAC-PDU #3, the candidate GMH being determined from the error-corrected MAC-PDU #2, is also NG (NO in S20), and thus the data reception processing device performs scanning from the GMH of the MAC-PDU #2 to search for a next GMH (in S24). When the GMH of the MAC-PDU #3, the GMH being determined from the scanning from the GMH of the MAC-PDU #2, is detected, the normal processing is resumed from the MAC-PDU #3 (in S26).

Subsequently, the GMH of the MAC-PDU #4 is read from the reception buffer 32 (in S10) and the result of the HCS checking is NG (i.e., NO in S12). Since the error correction count for the FEC block #2 is equal to or is greater than the reference value Nth (i.e., NO in S16), the data reception processing device discards the data of the MAC-PDU #4 and the subsequent MAC-PDU(s) in the FEC block #2 (in S28). Thereafter, scan is performed from the front-end address of the next FEC block #3 to search for a next GMH (in S28).

Subsequently, since the result of the HCS error checking on the GMH of the MAC-PDU #5 in the FEC block #3 is OK, the normal processing is started from the MAC-PDU #5 (in S14).

As described above, according to the present embodiment, a MAC-PDU from which an error is detected and the subsequent MAC-PDUs may be recovered without a decrease in the throughput.

According to the above-discussed embodiments, PDUs are recovered without a decrease in the performance of the data reception processing. Accordingly, a header having an error is recovered without a decrease in the throughput.

Although the embodiments in accordance with aspects of the present invention are numbered with, for example, "first," "second," or "third," the ordinal numbers do not imply priorities of the embodiment. Many other variations and modifications will be apparent to those skilled in the art.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

All examples and conditional language recited herein are intended for pedagogical purposes to aid the reader in understanding the aspects of the invention and the concepts contributed by the inventor to furthering the art, and are to be construed as being without limitation to such specifically recited examples and conditions, nor does the organization of such examples in the specification relate to a showing of the superiority and inferiority of the aspects of the invention. Although the embodiments in accordance with aspects of the present invention have been described in detail, it should be understood that the various changes, substitutions, and alterations could be made hereto without departing from the spirit and scope of the invention.

What is claimed is:

1. A data processing method for processing data units having headers, the data processing method comprising:
   checking an error on a first header; and
   determining whether or not to correct the error on the first header based on an error correction count for a first error correction processing block including the first header and at least a part of data following the first header.

2. The data processing method according to claim 1, comprising:
   discarding a first data unit comprising the first header and a second data unit in the error correction processing block comprising the first header, when the error correction count for the error correction processing block is equal to or greater than a reference value; and
   checking an error on a second header in a second error correction processing block after the first error correction processing block.

3. The data processing method according to claim 2, wherein the first reference value comprising a plurality of types of reference value preset in accordance with one of a modulation scheme, a coding rate of error correction coding, or any combination thereof in accordance with a communication environment; and the first reference value corresponds to one of the modulation scheme, the coding rate of the error correction coding, or any combination thereof.

4. The data processing method according to claim 1, comprising:
   correcting the error on the first header when the error correction count for the first error correction processing block is less than or equal to a first reference value.

5. The data processing method according to claim 4, wherein the first header comprises header data and an error correction bit determined from the header data, and wherein when the first header is corrected by the correcting, a position of the error on the first header is located based on the header data and the error correction bit and a bit at the located error position is corrected.

6. The data processing method according to claim 4, comprising:
   checking an error on a second header after the first header based on data-unit length information in the first header; and
   processing data of a data unit comprising the first header corrected by the correcting when the error on the second header is equal to or less than a second reference value.

7. The data processing method according to claim 4, comprising:
   checking an error on a second header after the first header based on data-unit length information in the first header corrected by the correcting, the second header being in a reception buffer;
   predicting the second header by scanning the reception buffer based on the first header corrected by the correcting when the error on the second header is detected; and
   processing data of a data unit comprising the second header predicted by the predicting when the error on the second header is equal to or less than a second reference value.

8. The data processing method according to claim 1, comprising:
   receiving a burst having at least one data unit and storing the burst in a reception buffer;
   dividing the burst into error correction processing blocks comprising the first error correction processing blocks; and
   correcting an error for each error correction processing block to detect the error correction count.

9. The data processing method according to claim 1, wherein the error correction count comprises the number of corrected bits corresponding to the number of bits in the first error correction processing block.

10. A data processing method for processing data units having headers, the data processing method comprising:
    checking an error on a first header;
    recovering on a first data unit comprising the first header and a second data unit after the first data unit, when one of an error correction count and an error correction rate for an error correction processing block including the first header and at least a part of data following the first header is less than or equal to a first reference value; and
    discarding the first data unit and the second data unit in the error correction processing block, when one of the error correction count and the error correction rate equals to or greater than the first reference value.

11. The data processing method according to claim 10, wherein the recovery processing comprises:
correcting the error on the first header;
checking an error on a second header after the first header is corrected by the correcting based on data-unit length information included in the first header corrected by the correcting;
processing a data unit comprising the first header corrected by the correcting, when the error on the second header is equal to or less than a second reference value;
predicting the second header by scanning a reception buffer based on the first header corrected by the correcting, when the error on the second header is detected; and
processing a data unit comprising the second header predicted by the predicting when the error on the second header predicted by the predicting is smaller than or equal to a second reference value.

12. A data processing method for processing data units having headers, the data processing method comprising:
checking an error on a first header;
correcting the error on the first header when the error is detected by the checking;
checking an error on a second header after the first header corrected by the correcting; and
processing a data unit including the first header corrected by the correcting, when the error on the second header equals or is smaller than a reference value.

13. The data processing method according to claim 12, comprising:
predicting the second header by scanning a reception buffer based on the first header corrected by the correcting when the error on the second header is detected; and
processing a data unit including the second header predicted by the predicting when an error on the second header predicted by the predicting is equal to or is less than a certain value.

14. A data processor for processing data units having headers, the data processor comprising:
a check unit operable for checking an error on a header; and
a determinate unit operable for determining whether or not to correct the error on the header based on an error correction count for an error correction processing block including the header and at least a part of data following the header.

* * * * *